Feb. 7, 1967  B. D. SCHWALM  3,302,770
CONVEYOR
Filed Feb. 8, 1966  2 Sheets-Sheet 1
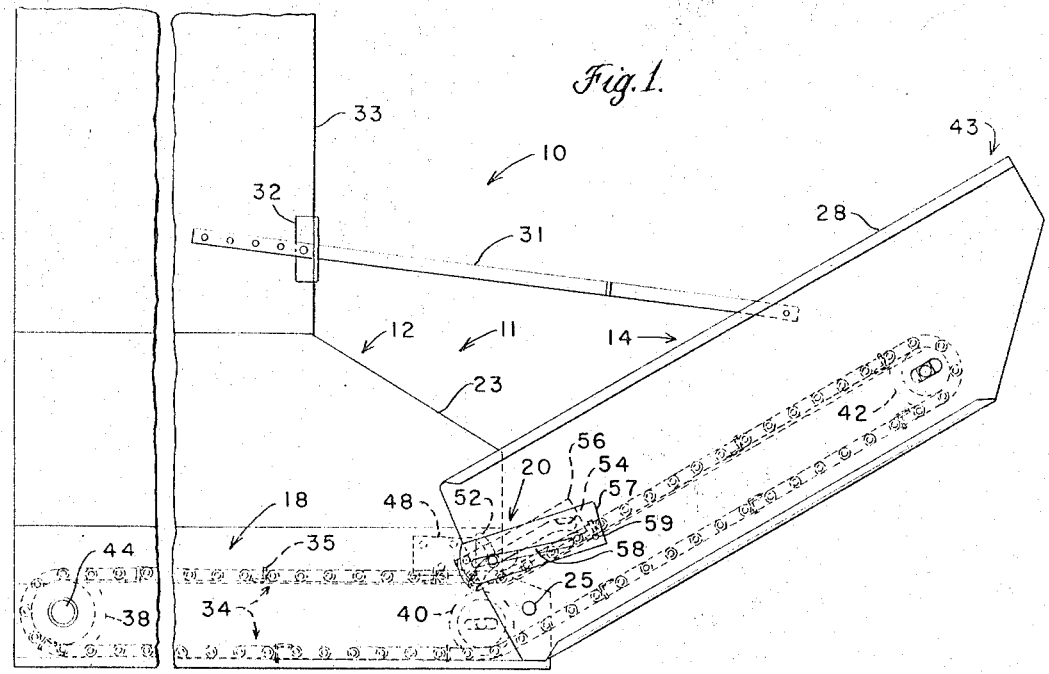
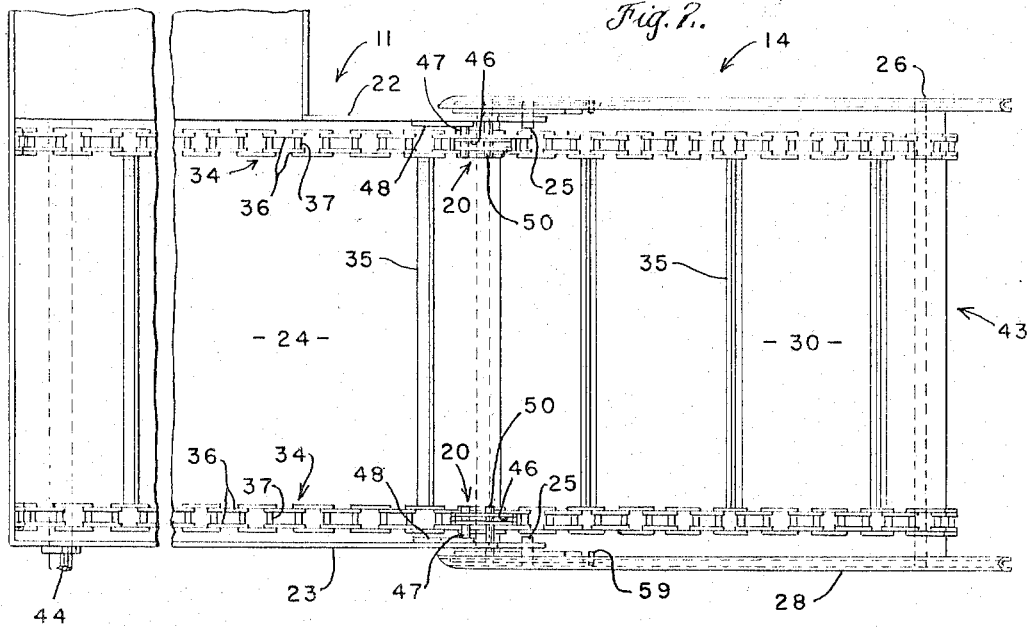
INVENTOR.
BRUCE D. SCHWALM
BY
Donald D. Schaper
ATTORNEY Feb. 7, 1967   B. D. SCHWALM   3,302,770
CONVEYOR
Filed Feb. 8, 1966   2 Sheets-Sheet 2
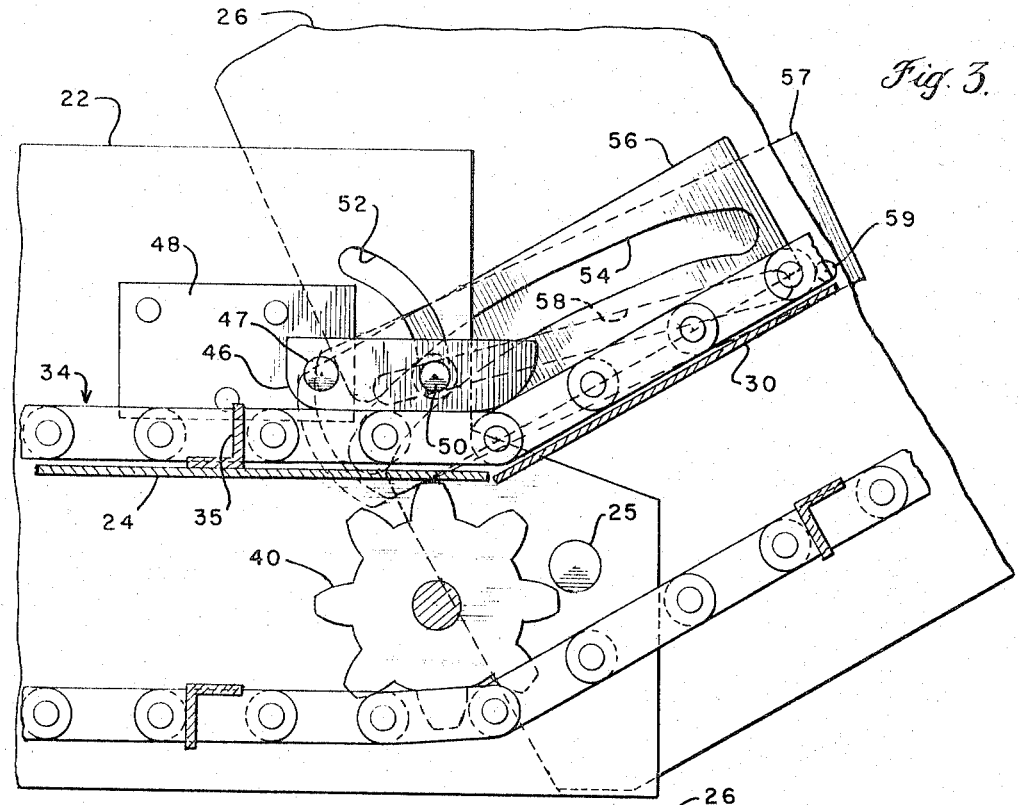
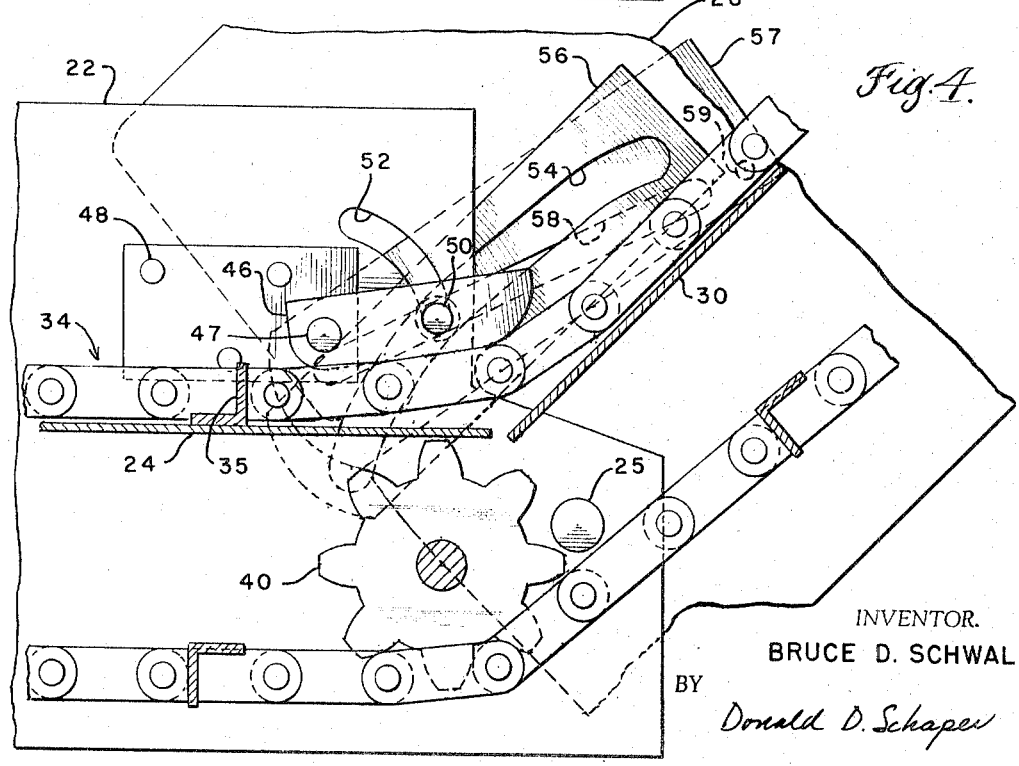
INVENTOR.
BRUCE D. SCHWALM
BY
Donald D. Schaper
ATTORNEY

3,302,770
CONVEYOR

Bruce D. Schwalm, Leola, Pa., assignor to Sperry Rand Corporation, New Holland, Pa., a corporation of Delaware
Filed Feb. 8, 1966, Ser. No. 525,881
7 Claims. (Cl. 198—109)

This invention relates to material handling apparatus. More particularly, this invention relates to an improvement in a conveyor or unloader of the type used in self-unloading wagons.

It is common in self-unloading wagons of the agricultural type to have a floor conveyor which moves material to one end of the wagon where it is received by a cross conveyor. The cross conveyor then moves the material transversely across the wagon floor and discharges it in a feed bunk or other receptacle.

A conventional cross conveyor comprises a U-shaped trough portion along the forward end of the wagon and an inclined extension which is adjustably mounted at one end of the trough portion so that material can be discharged into receptacles of various heights. An apron conveyor, which includes a pair of spaced apart endless chains joined by a series of slats or cross bars, moves the material along the floor of the trough portion and up the inclined extension. Heretofore, a problem has existed in maintaining the conveyor chains closely adjacent the conveyor floor in the area where the chains start to move up the inclined extension. Stationary guide shoes, or guide sheaves, have been used to keep the chains in position in this area. However, the stationary guides do not function efficiently, unless they are manually adjusted each time the inclined extension is set at a new angle.

Accordingly, one object of this invention is to provide, in a conveyor of the type described, a chain guide means which is equally effective at all angular settings of the conveyor extension.

Another object of this invention is to provide a chain guide means which adjusts automatically for each angular setting of the conveyor extension.

A further object of this invention is to provide chain guide means which permits the conveyor extension to be moved to a substantially vertical storage position.

A still further object of this invention is to provide a chain guide means which maintains the conveyor chains in position with a minimum amount of wear on the chain.

Other objects will be apparent hereinafter from the specification and from the recital in the appended claims.

In the drawings:

FIG. 1 is an elevational view looking at a portion of the forward end of a self-unloading wagon and showing the cross conveyor with the angularly adjustable cross conveyor extension;

FIG. 2 is a plan view of FIG. 1;

FIG. 3 is an enlarged fragmentary sectional view of a portion of the cross conveyor, and showing the position of the chain guide shoes when the conveyor extension is at an angle of thirty degrees; and FIG. 4 is a view similar to FIG. 3, but with the conveyor extension raised to an angle of forty-five degrees, and showing the slightly inclined position of the chain guide shoes when the extension is at this angle.

Referring now to the drawings by numerals of reference and particularly to FIG. 1, the forward end portion of a self-unloading wagon is designated generally by the reference numeral 10. A cross conveyor 11 in wagon forward end portion 10 comprises a first section 12 which is integral with the wagon, an angularly adjustable conveyor extension 14, an endless chain conveyor means 18, and chain guide means 20.

Cross conveyor section 12 comprises a pair of vertical side walls 22 and 23, and a horizontal floor portion 24.

Conveyor extension 14 is pivotally mounted on side walls 22 and 23 by a pair of pins 25. Extension 14 comprises a pair of vertical side panels 26 and 28, and a floor panel 30 which extends between side panels 26 and 28 and terminates inwardly closely adjacent floor portion 24 of conveyor section 12. A bar 31 holds extension 14 in an angular position and is adjustably attached to bracket 32 on wagon bed 33.

Conveyor means 18 comprises a pair of endless chains 34—34 which are joined by a series of transverse slats 35, a first pair of sprockets 38—38 journalled in side walls 22 and 23 at one end of conveyor section 12, a second pair of sprockets 40—40 journalled in side walls 22 and 23 at an opposite end of section 12, and a third pair of sprockets 42—42 journalled in side panels 26 and 28 at the discharge end 43 of conveyor section 14. Conveyor means 18 is driven through a drive shaft 44 which is adapted to be connected to the power-take-off of a tractor, or to another power source.

The chain guide means 20 is an important feature of this invention and is shown in detail in FIGS. 3 and 4. An identical guide means 20 is provided for each of the chains 34, and thus, only the guide means for the chain adjacent wall 22 and panel 26 will be described. Guide means 20 comprises a guide shoe 46 which is pivotally mounted on a pin 47 extending from a mounting plate 48 on side wall 22. A rod 50 fixed to one end of guide shoe 46 extends through a curved slot 52 in side wall 22 and through a cam slot 54 in side panel 26. A roller 55 rotatably mounted on rod 50 contacts the side walls of a cam slot 54 in panel 26; a reinforcing plate 56 is fixed to the inside surface of side panel 26 in the area of cam slot 54 to provide additional strength and a wider bearing surface for roller 55. A cover plate 57 having a slot 58 therein is pivotally mounted at 59 to the outside surface of panel 26 to prevent material from escaping through slot 54.

In operation, power is supplied to shaft 44 to rotate sprockets 38—38 in a clockwise direction, when viewed as shown in FIG. 1. Material is delivered to cross conveyor 11 by the wagon apron conveyor (not shown) and is moved transversely by conveyor means 18 to the discharge end 43 of conveyor extension 14. The chain guide means 20 serve to maintain chains 34 closely adjacent the conveyor floor at the junction of the floor portion 24 and extension floor panel 30.

The angular position of guide shoes 46 is precisely controlled for each angular setting of conveyor extension 14. When conveyor extension 14 is set at an angle of thirty degrees, the guide shoes 46 are substantially horizontal, as shown in FIG. 3; when conveyor extension 14 is pivoted upwardly to an angle of forty-five degrees, guide shoes 46 will also be pivoted upwardly, as shown in FIG. 4. Cam slots 54 in side panels 26 and 27 determine the angular position of guide shoes 46. Rollers 55 carried on rods 50 contact the sides of slots 54, and as conveyor extension 14 is pivoted upwardly, the movement is transmitted through rollers 55 and rods 50 to guide shoes 46 to move the shoes upwardly a corresponding amount. It will be seen that the amount of angular movement of the guide shoes 46 can be controlled by the design of cam slots 54.

Under some conditions, for example in storage or for transport, it is desirable to move extension 14 to a substantially vertical position. In the disclosed conveyor, guide shoes 46 move upwardly when extension 14 is moved upwardly and a substantially vertical storage position can be attained, without adjusting the guide shoes in any manner.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. Material handling apparatus comprising conveyor means, said conveyor means having a first section and a second section angularly adjustable relative to said first section, guide means pivotally mounted on said first section, cam means on said second section, following means operatively connecting said guide means to said cam means so that angular adjustment of said second section results in a corresponding angular adjustment of said guide means.

2. Material handling apparatus, as recited in claim 1, wherein said conveyor means comprises an endless chain and said guide means comprises a guide shoe in contact with said chain.

3. Material handling apparatus, as recited in claim 2, wherein said first section comprises a horizontal floor portion and a pair of vertical side walls spaced on opposite sides of said portion, said second section comprises a pair of vertical side panels and a floor panel extending between said panels, and one end of said second section is pivotally mounted on said first section.

4. Material handling apparatus, as recited in claim 3, wherein said endless chain extends around said floor portion and said floor panel, and transverse slats are attached to said chain at spaced intervals to contact material and move it along said floor portion and said floor panel.

5. Material handling apparatus, as recited in claim 4, wherein said second section is pivotal to a substantially vertical position for storage.

6. Material handling apparatus, as recited in claim 4, wherein said second section has a discharge end opposite said one end, a first sprocket means is journalled in said side walls and spaced from said second section, a second sprocket means is journalled in said side walls adjacent said second section one end, a third sprocket means is journalled in said vertical side panels at said discharge end, and said endless chain extends over said floor portion and said floor panel and around said sprocket means.

7. Material handling apparatus as recited in claim 6, wherein said conveyor means is adapted to be mounted in a self-unloading wagon, and drive means is operatively connected to said first sprocket means.

No references cited.

EVON C. BLUNK, *Primary Examiner.*

M. L. AJEMAN, *Assistant Examiner.*